J. Purinton, Jr,
Shoe Sole,
No. 2,556. Reissued Apr. 9, 1867.
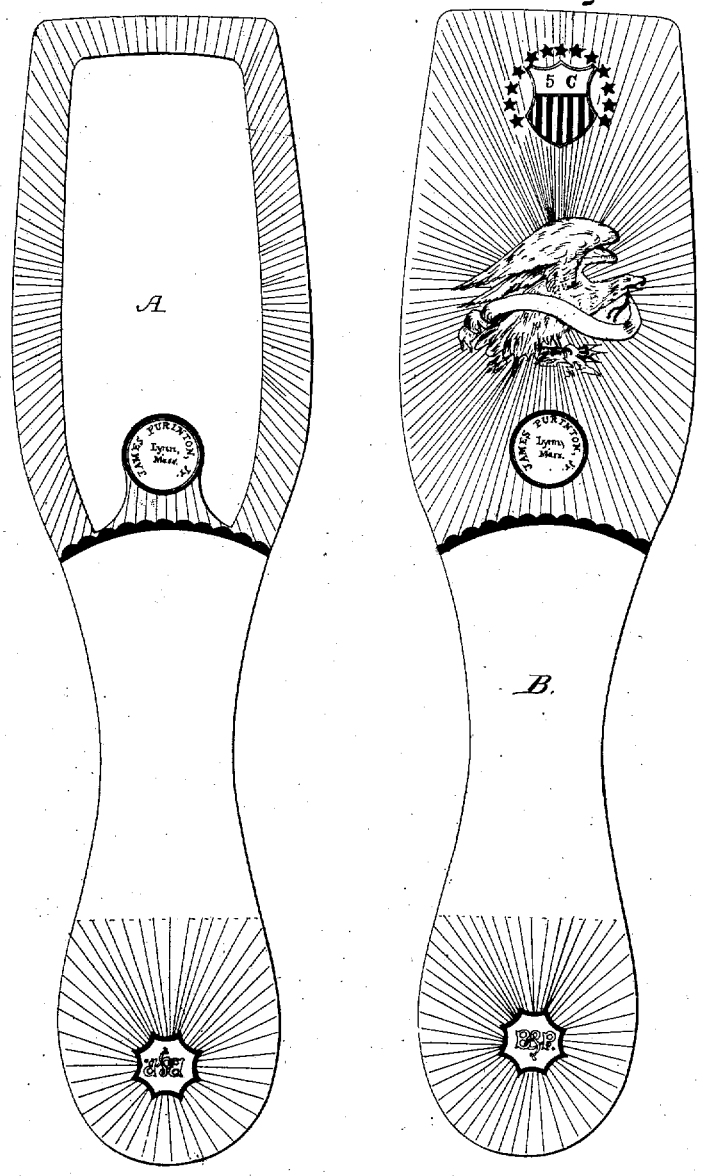
Witnesses,
J. R. Grinden
Hart Nichols.
Inventor.
James Purinton Jr
per
N. PETERS, PHOTO-LITHOGRAPHER, WASHINGTON, D. C.

United States Patent Office.

JAMES PURINTON, JR., OF LYNN, MASSACHUSETTS.

*Letters Patent No.* 41,394, *dated January* 26, 1864; *reissue No.* 2,556, *dated April* 9, 1867.

IMPROVED MODE OF FINISHING SOLES OF BOOTS AND SHOES.

The Schedule referred to in these Letters Patent and making part of the same.

TO ALL WHOM IT MAY CONCERN:

Be it known that I JAMES PURINTON, Jr., of Lynn, in the county of Essex, and State of Massachusetts, have invented an improved Mode of Finishing the Soles of Boots and Shoes; and I do hereby declare that the following, taken in connection with the drawings, which accompany and form part of this specification, is a description of my invention, sufficient to enable those skilled in the art to practise it.

The nature of my invention consists in attaching, by cement or otherwise, and covering entirely or partially, the outer surface of the outer sole or heel with paper or other material, rendering unnecessary several processes now in use, (such as laying the channel, scraping, buffing, finishing the shank, &c.,) thereby saving a large per cent. in the cost, without injury, but with benefit to the quality. I am aware that gutta percha, rubber, cloth, &c., have been used for different purposes upon the outer soles of boots and shoes, but not for the purpose of giving a finish, or of concealing the stitching, pegging, or nailing, as described by me.

In the accompanying drawings, A and B represent soles covered with paper in accordance with my invention, the tap-sole or forward part of the sole and the heel being shown as entirely covered, though it will be obvious that the finishing result may be attained without extending the finishing material to the extreme edge of the sole.

I claim as a new article of manufacture, a boot or shoe having a finish imparted to the heel or sole, by covering the outer surface of the same, in whole or in part, by paper or other material, substantially as set forth.

JAMES PURINTON, JR.

Witnesses:

FRANCIS GOULD,

L. H. LATIMER.